(12) United States Patent
Levy

(10) Patent No.: US 7,368,484 B2
(45) Date of Patent: May 6, 2008

(54) REVERSE THERMAL GELS AS SUPPORT FOR RAPID PROTOTYPING

(75) Inventor: Avraham Levy, Petach Tikva (IL)

(73) Assignee: Objet Geometries Ltd., Rehovot (IL)

( * ) Notice: Subject to any disclaimer, the term of this patent is extended or adjusted under 35 U.S.C. 154(b) by 0 days.

(21) Appl. No.: 11/544,624

(22) Filed: Oct. 10, 2006

(65) Prior Publication Data

US 2007/0032563 A1 Feb. 8, 2007

Related U.S. Application Data

(62) Division of application No. 10/998,644, filed on Nov. 30, 2004, now abandoned, which is a division of application No. 10/218,514, filed on Aug. 15, 2002, now Pat. No. 6,863,859.

(60) Provisional application No. 60/312,490, filed on Aug. 16, 2001.

(51) Int. Cl.
G03C 9/08 (2006.01)
C08F 2/46 (2006.01)

(52) U.S. Cl. .......................... 522/10; 522/31; 522/32; 522/39; 522/46; 522/64; 522/74; 522/77; 522/88; 430/269

(58) Field of Classification Search ................. 522/120, 522/121, 10, 31, 32, 39, 46, 90–107, 64, 522/74, 77, 88, 134–147; 430/269
See application file for complete search history.

(56) References Cited

U.S. PATENT DOCUMENTS

| | | |
|---|---|---|
| 4,094,756 A | 6/1978 | Taylor |
| 4,303,924 A | 12/1981 | Young, Jr. |
| 5,028,362 A | 7/1991 | Janney et al. |
| 5,136,515 A | 8/1992 | Helinski |
| 5,270,368 A | 12/1993 | Lent et al. |
| 5,287,435 A | 2/1994 | Cohen et al. |
| 5,322,648 A | 6/1994 | Dapper |
| 5,387,380 A | 2/1995 | Cima et al. |
| 5,569,691 A | 10/1996 | Guggenberger et al. |
| 5,697,043 A | 12/1997 | Baskaran et al. |
| 5,702,717 A | 12/1997 | Cha et al. |
| 5,779,967 A | 7/1998 | Hull |
| 5,798,437 A | 8/1998 | Hancock et al. |
| 5,824,250 A | 10/1998 | Whalen et al. |
| 5,889,084 A | 3/1999 | Roth |
| 5,906,781 A | 5/1999 | Tobin |
| 5,939,485 A | 8/1999 | Bromberg et al. |
| 5,943,235 A | 8/1999 | Earl et al. |
| 6,004,573 A | 12/1999 | Rathi et al. |
| 6,136,252 A | 10/2000 | Bedal et al. |
| 6,193,923 B1 | 2/2001 | Leyden et al. |
| 6,251,557 B1 | 6/2001 | Lapin et al. |
| 6,259,962 B1 | 7/2001 | Gothait |
| 6,413,458 B1 | 7/2002 | Pearce |
| 6,490,496 B1 | 12/2002 | Dacey |
| 6,508,971 B2 | 1/2003 | Leyden et al. |
| 6,532,394 B1 | 3/2003 | Earl et al. |
| 6,569,373 B2 * | 5/2003 | Napadensky ................ 264/401 |
| 6,579,951 B1 | 6/2003 | Cohn et al. |
| 6,658,314 B1 | 12/2003 | Gothait |
| 6,730,772 B2 | 5/2004 | Shastri |
| 6,800,663 B2 * | 10/2004 | Asgarzadeh et al. ........ 516/108 |
| 7,018,645 B1 * | 3/2006 | Piao et al. ................... 424/426 |
| 2002/0011693 A1 | 1/2002 | Leyden et al. |
| 2002/0016386 A1 | 2/2002 | Napadensky |
| 2003/0044468 A1 * | 3/2003 | Cellesi et al. ................ 424/487 |
| 2003/0175410 A1 * | 9/2003 | Campbell et al. .......... 427/2.24 |
| 2003/0187148 A1 | 10/2003 | Cohn et al. |

FOREIGN PATENT DOCUMENTS

| | | |
|---|---|---|
| EP | 0 852 536 | 9/2002 |
| WO | WO 97/11837 | 4/1997 |

* cited by examiner

*Primary Examiner*—Susan Berman
(74) *Attorney, Agent, or Firm*—Pearl Cohen Zedek Latzer, LLP

(57) ABSTRACT

The present invention relates to novel polymeric compositions that exhibit Reverse Thermal Gelation (RTG) properties for use as Support Materials (SM) in the manufacture of three-dimensional objects. These polymers are Temperature Sensitive Polymers that respond with a significant change of properties to a small change in temperature. Temperature Sensitive Polymers exhibit cloud point (CP) or lower critical solution temperature (LCST) in aqueous solutions. Water-soluble Temperature Sensitive Polymers are chosen to give low viscosity liquid at low temperature when dissolved in water and by that to permit easy dispensing at low temperature. Raising the temperature above their gelation temperature ($T_{gel}$) will result in solidification of the composition. At its gel position the material has favorable characteristics as a support and building material. The gel layers have the appropriate toughness and dimensional stability to support the model layers during the building process. After the building process is completed the gel can be cooled down to a temperature below its $T_{gel}$ so the gel can liquefy and be removed easily by rinsing with water.

32 Claims, 1 Drawing Sheet

REVERSE THERMAL GELS AS SUPPORT FOR RAPID PROTOTYPING

CROSS-REFERENCE TO RELATED APPLICATIONS

This application is a divisional application of U.S. patent application Ser. No. 10/998,644, filed Nov. 30, 2004, now abandoned, which is a divisional application of U.S. patent application Ser. No. 10/218,514, filed Aug. 15, 2002, now U.S. Pat. No. 6,863,859, which claims priority from provisional application U.S. Ser. No. 60/312,490, filed 16 Aug. 2001, entitled "REVERSE THERMAL GELS AS SUPPORT FOR RAPID PROTOTYPING", all of which are incorporated in its entirety by reference herein.

FIELD OF THE INVENTION

Embodiments of the present invention relate to methods of using novel polymeric compositions as support and build materials for Rapid Prototyping (RP), Rapid Manufacturing (RM) and Rapid Tooling (RT) processes. These polymeric compositions exhibit Reverse Thermal Gelation (RTG) properties, i.e. low viscosity at low temperature and high viscosity (or semi-solid) gels at higher temperatures.

BACKGROUND OF THE INVENTION

Rapid prototyping is a generic name of various technologies for producing three-dimensional models, usually from three-dimensional CAD (Computer Aided Design) data.

One such technology is known in the art as three-dimensional printing, in which layers descriptive of the model are produced from the CAD data, then a curable liquid material, usually a photopolymer, is dispensed and cured layer by layer by exposure to light.

One such technique is disclosed in U.S. Pat. No. 6,658,314 assigned to the applicants of the present invention, filed Oct. 6, 1999, entitled "SYSTEM AND METHOD FOR THREE DIMENSIONAL MODEL PRINTING," incorporated herein by reference.

According to certain embodiments described in U.S. Pat. No. 6,658,314, the model is produced from a building material (BM), which is a curable liquid photopolymer, dispensed by ink jet multi-nozzle heads. Simultaneously with the BM dispensing, a second set of ink jet heads dispenses Support Material (SM), which exhibits different properties from those of the BM.

Preferably, the SM is dispensed in locations where BM is absent, thus holding the liquid BM in place until being cured. At the conclusion of the model production, the SM is to be disposed without spoiling the model.

There are many techniques, known in the art, for SM removal, which depend on the material properties. Using wax, for instance, as SM, enables SM removing by raising the model temperature beyond the melting point of the SM.

Another known technique is stereolithography, in which use is made of a single curable material in a container, curing selectively only those portions required to form the model, the uncured portions are used as support materials and are removed at a later stage. This technique is disclosed by for example U.S. Pat. No. 5,779,967 to Hull.

Rapid prototyping (RP) techniques are known in the art as techniques used to produce models out of three-dimensional CAD data. In the same way, rapid tooling (RT) manufacturing techniques are generally used for rapid manufacturing of casting molds. Rapid manufacturing (RM) techniques are generally used for direct manufacturing of finished parts.

In all of these prior art techniques the unnecessary part (i.e. the support, the mold or the core) should be disposed, leaving the other part intact. In these above-mentioned techniques, the materials used as SM do not exhibit the optimal combination of properties required, i.e. easy dispensing, toughness as supporting material, easy removal from the finished model and friendliness to the environment. Thus, there is a strong need in the art for new and better materials that can be used to support 3-dimensional objects during construction.

SUMMARY OF THE INVENTION

In one embodiment, the present invention provides a composition suitable for supporting and/or building a three-dimensional object, the composition comprising at least one Temperature Sensitive Polymer, and at least one surface-active agent, wherein the composition exhibits Reverse Thermal Gelation (RTG) properties.

Furthermore, in another embodiment, the present invention provides a method for building a three-dimensional object by three dimensional printing, the method comprising the steps of dispensing a building composition, comprising at least one Temperature Sensitive Polymer, wherein the building composition exhibits Reverse Thermal Gelation (RTG) properties and at least one surface-active agent; and gelating the building composition by increasing temperature to above gelation temperature, thereby constructing the three dimensional object.

Furthermore, in another embodiment, the present invention provides a method for supporting a three-dimensional object during construction, the method comprising the step of contacting the object with a support composition, comprising at least one Temperature Sensitive Polymer, wherein the support composition exhibits Reverse Thermal Gelation (RTG) properties and at least one surface-active agent; gelating the support composition by increasing temperature to above gelation temperature, thereby supporting the three dimensional object.

Furthermore, in another embodiment, the method further comprises the step of easy removing the support composition after construction of the object by cooling the support composition to a temperature below the gelation temperature.

Furthermore, in another embodiment, the construction comprises Rapid Prototyping (RP), Rapid Manufacturing (RM) or Rapid Tooling (RT).

In one embodiment, the construction comprises rapid tooling (RT), wherein the rapid tooling (RT) comprises building a casting mold with the support composition for holding the object, and building the object in the mold. In another embodiment, the method further comprises the step of easy removing the mold by cooling the support composition to a temperature below the gelation temperature.

In another embodiment, the construction comprises Rapid Manufacturing (RM), wherein the rapid manufacturing (RM) comprises direct manufacturing of finished parts.

In one embodiment, the Temperature Sensitive Polymer is a water-soluble Temperature Sensitive Polymer. In another embodiment, the water-soluble Temperature Sensitive Polymer is an ABA triblock oligomer, wherein A and B are oligomers. In another embodiment, A is a hydrophilic oligomer and B is a hydrophobic oligomer. In another embodiment, A is a hydrophobic oligomer and B is a hydrophilic oligomer. In another embodiment, A and B comprise aliphatic polyether and/or polyester units. In another embodiment, A is poly(ethylene oxide) and B is poly(propylene oxide).

In another embodiment, the water-soluble Temperature Sensitive Polymer is a multi blocks polymer of $(ABA-X)_m$, organized at random or repetitive configuration, wherein wherein A and B are oligomers, m is an integer of 1-30, and X is a chain extender. In one embodiment, X is selected from the group consisting of di, tri and poly isocyanates, di, tri and poly carboxylic acids, diacyl halides, triphosgene or any combination thereof. In another embodiment, A is a hydrophilic oligomer and B is a hydrophobic oligomer. In another embodiment, A is a hydrophobic oligomer and B is a hydrophilic oligomer. In another embodiment, the multi block polymer of ABA is a polyurethane, a polycarbonate, a polyester or any combination thereof.

In another embodiment, the Temperature Sensitive Polymer is a poly (N-substituted (meth)acrylamide). In one embodiment, the poly (N-substituted (meth)acrylamide) is a poly (N-isopropyl (meth)acrylamides). In another embodiment, the Temperature Sensitive Polymer is a poly vinyl alcohol derivative, hydroxypropyl methylcellulose, ethyl hydroxyethyl cellulose (EHEC) or any combination thereof.

In one embodiment, the surface-active agent is capable of reducing the surface tension of the support and/or building composition to about 30 dyne/cm. In another embodiment, the surface-active agent is a silicon surface-active agent additive, fluoro-based surface-active agent or any combination thereof.

Furthermore, in another embodiment, the support and/or building composition further comprise at least one photo curable reactive component, at least one photo-initiator, and at least one stabilizer. In one embodiment, the method further comprises the step of curing the support and/or building composition, thereby increasing the strength of the support and/or building composition. In one embodiment, the curable reactive component is a (meth)acrylic component. In another embodiment, the (meth)acrylic component is a (meth)acrylic monomer, a (meth)acrylic oligomer, or a combination thereof. In another embodiment, the (meth)acrylic component is a polyethylene glycol mono or di (meth)acrylated, polyether triacrylate or any combination thereof. In another embodiment, the reactive component is a water miscible component that is, after irradiation or curing, capable of dissolving or swelling upon exposure to water or to an alkaline or acidic water solution. In another embodiment, the water miscible component is an acryloyl morpholine, (meth)acrylated urethane oligomer derivative of polyethylene glycol, a partially (meth)acrylated polyol oligomer, an (meth)acrylated oligomer having hydrophillic substituents or any combination thereof. In another embodiment, the hydrophilic substituents are acidic substituents, amino substituents, hydroxy substituents or any combination thereof. In another embodiment, the (meth)acrylic component is beta-carboxyethyl acrylate. In one embodiment, the reactive component is a molecule having one or more vinyl ether substituents. In another embodiment, the vinyl ether substituent is hydroxy-butyl vinyl ether.

In one embodiment, the photo-initiator is a free radical photo-initiator, a cationic photo-initiator, or any combination thereof. In one embodiment, the free radical photo-initiators are benzophenones, acylphosphine oxide, alpha-amino ketone or any combination thereof. In one embodiment, the cationic photo-initiator is selected from the group comprising: aryldiazonium salts, diaryliodonium salts, triarylsulphonium salts, triarylselenonium salts and triarylsolfonium hexafluoroantimonate salts, or any combination thereof.

In one embodiment, the photo-initiator further comprises a co-initiator component. In another embodiment, the co-initiator component is triethanol amine.

In one embodiment, the stabilizer is 4-methoxy phenol.

Furthermore, in another embodiment, the present invention provides a method for the preparation of a three-dimensional object by three-dimensional printing comprising the step of dispensing a model composition from a first dispenser, the model composition comprising at least one reactive component, at least one photo-initiator, at least one surface-active agent, and at least one stabilizer; dispensing a support composition from a second dispenser, the support composition comprising at least one Temperature Sensitive Polymer, at least one surface-active agent; and combining the model composition and the support composition in pre-determined proportions to produce a multiplicity of construction layers for forming the three-dimensional object, whereby the model composition is cured resulting in a solid form, and whereby the support composition is gelated by increasing temperature to above gelation temperature resulting in a gel form.

In one embodiment, the reactive component of the model composition is selected from the group consisting of an acrylic component, a molecule having one or more epoxy substituents, a molecule having one or more vinyl ether substituents, vinylpyrolidone, vinylcaprolactam, or any combination thereof. In another embodiment, the reactive component of the model composition is comprised of at least one acrylic component. In another embodiment, the acrylic component is an acrylic monomer, an acrylic oligomer, an acrylic crosslinker, or any combination thereof. In another embodiment, the reactive component of the model composition further comprises a molecule having one or more epoxy substituents, a molecule having one or more vinyl ether substituents, vinylcaprolactam, vinylpyrolidone, or any combination thereof. In another embodiment, the reactive component of the model composition further comprises vinylcaprolactam. In another embodiment, the reactive component of the model composition is a molecule having one or more vinyl ether substituents. In another embodiment, the reactive component of the model composition is a molecule having one or more epoxy substituents.

In one embodiment, the photo-initiator of the model composition is a free radical photo-initiator, a cationic photo-initiator or any combination thereof.

In one embodiment, the model composition further comprises at least one pigment and at least one dispersant. In another embodiment, the pigment is a white pigment, an organic pigment, an inorganic pigment, a metal pigment or a combination thereof. In another embodiment, the model composition further comprises a dye.

Furthermore, in another embodiment, the present invention provides a three dimensional object, obtained by any of the methods of the present invention.

BRIEF DESCRIPTION OF THE DRAWINGS

Embodiments of the present invention will be understood and appreciated more fully from the following detailed description taken in conjunction with the appended drawings in which.

DETAILED DESCRIPTION OF THE INVENTION

Figure 1:
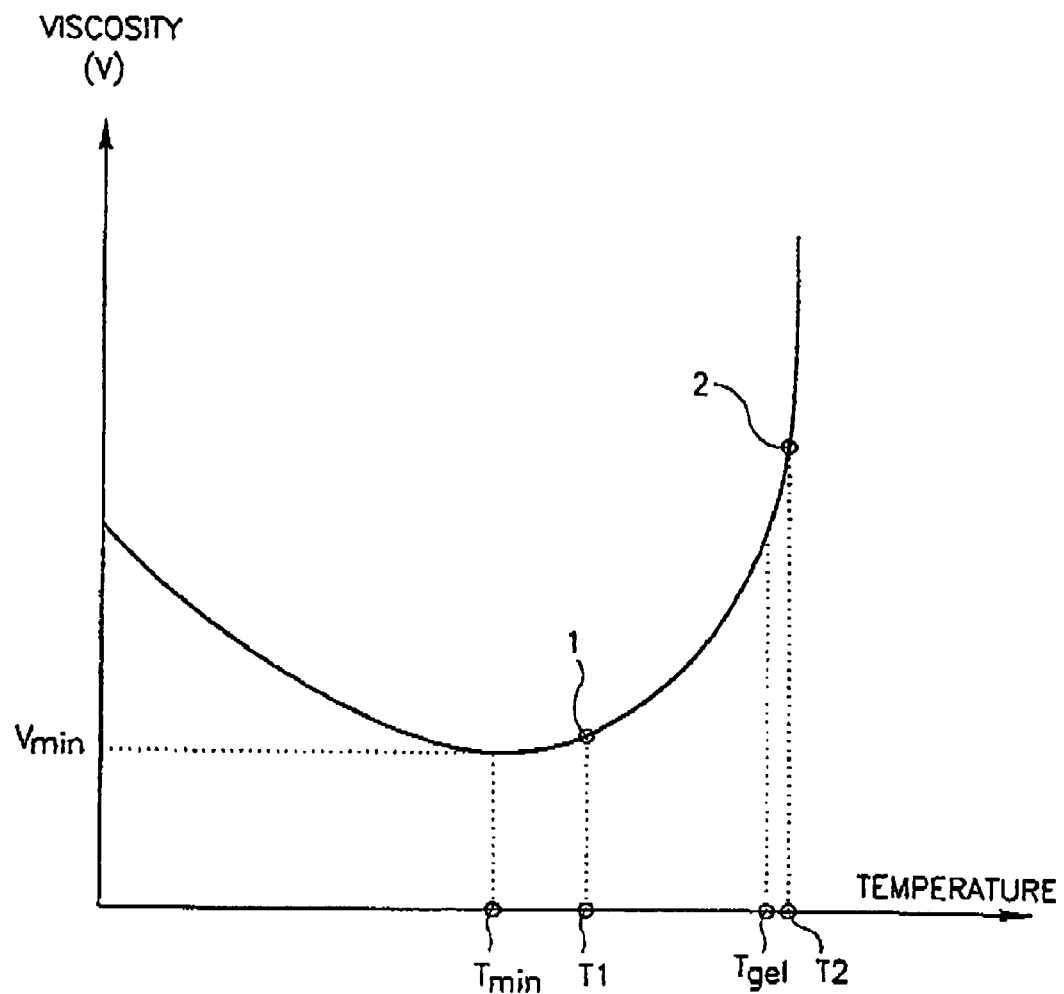
FIG. 1: A typical RTG graph of viscosity—temperature relation is shown. At a specific temperature $T=T_{min}$ the specific composition has its minimal viscosity Vmin. Raising the temperature causes the viscosity to increase until at $T=T_{gel}$ the composition is transformed into gel i.e. an abrupt change in its mechanical properties. Raising the temperature further to $T=T_2$ will raise the viscosity until the required viscosity for supporting material is attained.

Embodiments of the present invention relate to novel polymeric compositions that exhibit Reverse Thermal Gelation (RTG) properties for use as Support Materials (SM) in the manufacturer of three-dimensional objects. These polymers are Temperature Sensitive Polymers that respond with a significant change of properties to a small change in temperature. Temperature Sensitive Polymers exhibit cloud point (CP) or lower critical solution temperature (LCST) in aqueous solutions. Water-soluble Temperature Sensitive Polymers are chosen to give low viscosity liquid at low temperature when dissolved in water and by that to permit easy dispensing at low temperature. Raising the temperature above their gelation temperature ($T_{gel}$) will result in solidification of the composition. At its gel position the material has favorable characteristics as a support and building material. The gel layers have the appropriate toughness and dimensional stability to support the model layers during the building process. After the building process is completed the gel can be cooled down to a temperature below its $T_{gel}$ so the gel can liquefy and be removed easily by rinsing with water.

In one embodiment, the methods of the present invention are used with systems and methods as described by U.S. Pat. No. 6,658,314. In another embodiment the methods of the present invention may be used with other systems and methods for building three-dimensional objects, for example, without limitation, for stereolithography, described above.

In one embodiment, the present invention provides a composition suitable for supporting and/or building a three-dimensional object, the composition comprising at least one Temperature Sensitive Polymer, and at least one surface-active agent, wherein the composition exhibits Reverse Thermal Gelation (RTG) properties. In another embodiment, the present invention further provides a method for building a three-dimensional object by three dimensional printing, the method comprising the steps of dispensing a building composition, comprising at least one Temperature Sensitive Polymer, wherein the building composition exhibits Reverse Thermal Gelation (RTG) properties and at least one surface-active agent; and gelating the building composition by increasing temperature to above gelation temperature, thereby constructing the three dimensional object. In another embodiment, the present invention further provides a method for supporting a three-dimensional object during construction, the method comprising the step of contacting the object with a support composition, comprising at least one Temperature Sensitive Polymer, wherein the support composition exhibits Reverse Thermal Gelation (RTG) properties and at least one surface-active agent; gelating the support composition by increasing temperature to above gelation temperature, thereby supporting the three dimensional object. In another embodiment, the present invention further provides a method for the preparation of a three-dimensional object by three-dimensional printing comprising the step of dispensing a model composition from a first dispenser, the model composition comprising at least one reactive component, at least one photo-initiator, at least one surface-active agent, and at least one stabilizer; dispensing a support composition from a second dispenser, the support composition comprising at least one Temperature Sensitive Polymer, at least one surface-active agent; and combining the model composition and the support composition in pre-determined proportions to produce a multiplicity of construction layers for forming the three-dimensional object, whereby the model composition is cured resulting in a solid form, and whereby the support composition is gelated by increasing temperature to above gelation temperature resulting in a gel form.

Non-limiting examples of polymeric compositions used with embodiments of the present invention are based on water solutions of Temperature Sensitive Polymers, which exhibit RTG, for example:

1. ABA triblocks oligomers.
2. Multi blocks polymers of ABA, of random or repetitive configuration.
3. Star configuration molecules, often called radial.
4. Grafted chains, often called comb.

The RTG phenomenon can be used to benefit:

1. Easy dispensing at low temperature and low viscosity.
2. The use of the dispensed material as a support material (SM) in the Rapid Prototyping (RP), Rapid Manufacturing (RM), and Rapid Tooling (RT) processes: raising the material temperature above its gelation temperature will transform it into gel.
3. Easy cleaning of the SM and BM: the RTG phenomenone is reversible, i.e. at a temperature lower than its gelation temperature the material liquefies, thus the SM can easily be washed off.

The effect of temperature is interesting: an increase in the aggregation number with increasing temperature has been observed, while the micellar radius remains constant. The conclusions are complicated by the rather broad CMT transition, and the fact that dynamic light scattering detects the micelle hydrodynamic radius, which includes the water hydrating the EO segments.

PEO-PPO-PEO copolymer solutions of high copolymer concentration exhibit a dramatic change in viscosity at temperatures close to ambient, revealing Reverse Thermal Gelation (RTG) properties. Many studies have shown that the observed changes in viscosity are due to a "hard-sphere crystallization" as the micelle concentration approaches the critical volume fraction of 0.53 (micelles close-packed).

The RTG phenomenon is not constricted only to micellar polymeric systems. Another RTG property of the particular type of polymers-Ethyl(hydroxyethyl)cellulose (EHEC), was discovered some years ago by Andres Carlsson and his colleagues. Solutions of EHEC and ionic surfactants of certain compositions are converted to gels when the temperature is increased. Moreover, the anomalous behavior of these EHEC-surfactant formulations is fully reversible as liquid solutions form clear and stable gels but re-liquefy when cooled to temperatures below the gelation point. The transition can occur at temperatures as low as 30-40° C. and the concentration of polymer and ionic surfactant needed to bring about the thermal gelation is rather low-in total about 1 wt %. The enhancement of surfactant binding to the EHEC polymeric chains at increased temperatures has been proposed to play a major role for the gelation. At increasing temperature the surfactant aggregation numbers becomes lower and the degree of ionization of the clusters becomes higher. This is due to hydrophobic association of polymer hydrophobic parts with the clusters at higher temperature. Thus, as long as segments from more than one polymer chains are associated with the clusters, an increase in the number of clusters may lead to an increased cross-linking which could result in gel formation.

Another type of temperature sensitive polymer is the Poly(N-isopropylacrylamide) [Poly (NIPAM)]. This polymer when prepared using free-radical initiators is soluble in solvents, which are capable of forming reasonably strong hydrogen bonds. In aqueous solution, it shows a lower critical solution temperature (LCST) at about 31° C. Poly (NIPAM) gel in water undergoes a volume-phase transition from swollen gel to a shrunken gel at about 33.6° C. This is due to the hydrophobic interaction between the polymer and water molecule. The phase separation takes place by association of the polymer molecules into larger aggregates formed by intermolecular hydrogen bonding and nonpolar bonds. The tendency for the formation of such bonds is also enhanced by the destabilization of ice like structure in water when nonpolar solutes aggregate. Alternatively, it is also possible to ascribe this phenomenon to the fact that the polymer is more ordered in dilute solution than in the concentrated phase and that this ordering is due to the relatively strong hydrogen bonds formed between water and the polymer. As the temperature is raised, these hydrogen bonds become weaker and the solution becomes unstable.

Embodiments of the present invention further relate to methods of using these compositions in Rapid Prototyping (RP), Rapid Manufacturing (RM) and Rapid Tooling (RT). Accordingly, it is one object of an embodiment of the present invention to provide novel temperature sensitive compositions in which can be used in the manufacturing of a three-dimensional object by three-dimensional printing.

It has now been discovered that these and other objectives can be achieved by the present invention, which provides polymeric compositions suitable for supporting and/or building a three-dimensional object.

In one embodiment the support and/or building composition is used as a support composition for supporting a three-dimensional object during construction. In another embodiment a model composition is used as a building composition for the construction of a three-dimensional object.

In another embodiment the support and/or building composition is used as a building composition, for example, without limitation, in medical applications.

Support and/or Building Composition

In one embodiment, the present invention provides a composition suitable for supporting and/or building a three-dimensional objects, the composition comprising at least one Temperature Sensitive Polymer; and at least one surface-active agent, wherein the composition exhibits Reverse Thermal Gelation (RTG) properties.

Temperature Sensitive Polymers have been extensively studied over the last decade. Number of possible molecular mechanisms can cause sharp transitions in these polymeric systems. In most of these mechanisms water is involved.

The main mechanism of a thermally induced phase separation is the release of hydrophobically bound water. A locally higher order of water molecules exists around the hydrophobic unit of the polymer in solution. As gelation occurs the interaction between the hydrophobic units of polymer molecules, squeezes out these ordered water molecules into the bulk solution of lower order. This results in an overall disorder or increased entropy, which is the driving force for hydrophobic association.

One of the most famous groups in Temperature Sensitive Polymers is the Pluronic block copolymers. The Pluronics are a series of water-soluble block copolymers, composed of two polyoxyethylene blocks separated by a polyoxypropylene block. The Pluronics all have the general structure of PEO-PPO-PEO. The ability of Pluronic copolymers to form micelles and gels makes them an important class of surfactants, which find widespread use in industrial applications such as detergency, dispersion stabilization, foaming, emulsification, lubrication and formation of cosmetics and inks. The amphiphilic property of Pluronic copolymers is the reason for their ability to create micelles above the CMC (critical micellization concentration) and the CMT (critical micellization temperature). The micellization of block copolymers, as in the case of conventional surfactants, obeys the closed association model, which assumes equilibrium between molecularly dispersed copolymer (unimer) and multimolecular aggregates (micelles). In the case of pluronic, when micellization occurs the degree of structuring of the water molecules is decreased. The hydrogen bonding structure in the water is restored and the water entropy increases, overcoming the entropy loss due to the localization of the hydrophobic chains in the micelles. The structure of the pluronic micelles in water has been investigated in many studies. In general, the unimer size is found to be approximately 1 nm and the micelle size 10 nm, independent of copolymer concentration.

In one embodiment, the Temperature Sensitive Polymer is a water-soluble Temperature Sensitive Polymer. In another embodiment, the water-soluble Temperature Sensitive Polymer is an ABA triblock oligomer, wherein A and B are oligomers. In another embodiment, A is a hydrophilic oligomer and B is a hydrophobic oligomer. In another embodiment, A is a hydrophobic oligomer and B is a hydrophilic oligomer. In another embodiment, A and B comprise aliphatic polyether and/or polyester units. In another embodiment, A is poly(ethylene oxide) and B is poly(propylene oxide).

Examples of Temperature Sensitive Polymers used with embodiments of the present invention are:

The water soluble block copolymers of poly(ethylene oxide)-poly(propylene oxide)-poly(ethylene oxide) which are commercially available as Poloxamers (ICI company) and Pluronics (Basf company). The types of Pluronic block copolymers which create gels in aqueous solutions at ambient temperature are: Pluronic: F-127, F-108, F-98, F-88, F-68, F-87, F-77, P-105, P-85, P-75, P-65, P-104, P-94, P-84, L-64, L-63, L-121, L-122.

In another embodiment, the water-soluble Temperature Sensitive Polymer is a multi blocks polymer of $(ABA-X)_m$, organized at random or repetitive configuration, wherein wherein A and B are oligomers, m is an integer of 1-30, and X is a chain extender. In one embodiment, X is selected from the group consisting of di, tri and poly isocyanates, di, tri and poly carboxylic acids, diacyl halides, triphosgene or any combination thereof. In another embodiment, A is a hydrophilic oligomer and B is a hydrophobic oligomer. In another embodiment, A is a hydrophobic oligomer and B is a hydrophilic oligomer. In another embodiment, the multi block polymer of ABA is a polyurethane, a polycarbonate, a polyester or any combination thereof.

Polymers synthesized by chain extension of the Pluronic molecule. These polymers has the general structure of poly $[Pluronic-X]_m$ Wherein X is a chain extender in the reapiting unit and m is the degree of polymerizasion (Dp). Examples for chain extenders are: di, tri and poly isocyanates, di, tri and poly carboxylic acids, di acyl halides like adipoyl chloride and adipoyl bromides, and triphosgene or any combination thereof.

In another embodiment, the Temperature Sensitive Polymer is a poly (N-substituted (meth)acrylamide). In one embodiment, the poly (N-substituted (meth)acrylamide) is a poly (N-isopropyl (meth)acrylamides). In another embodiment, the Temperature Sensitive Polymer is a poly vinyl alcohol derivative, hydroxypropyl methylcellulose, ethyl hydroxyethyl cellulose (EHEC) or any combination thereof.

Poly (N-substituted acrylamides) like poly N-isopropylacrylamide (Poly NIPAAM)

(Eastman Kodak or Aldrich). N-Substituted AAm and Methacrylamide (MAAm) or related monomers, Poly vinyl alcohol derivatives, hydroxypropyl methylcellulose, ethyl hydroxyethyl cellulose (EHEC) (Akzo Nobel) combined with ionic surfactants like SDS.

Another component of the formulation is a surface-active agent. A surface-active agent is used to reduce the surface tension of the formulation to the value required for jetting, which is typically around 30 dyne/cm. In one embodiment, the surface-active agent for the present invention is silicon surface-active agent additive, marketed by Byk Chemie under the trade name of Byk 345, fluoro-based surface-active agent or any combination thereof.

In one embodiment, the support and/or building composition further comprises at least one photo curable reactive component, at least one photo-initiator, and at least one stabilizer.

The reactive component is chosen to increase the strength of the temperature responsive gel upon curing. The reactive component gives a hydrophilic cured resin with very weak mechanical properties. The reactive component polymerizes upon curing at the same time when the Temperature Sensitive Polymer creates a gel. Thus the combination of reactive component with the Temperature Sensitive Polymer creates an increase in the strength of the gel due to synergistic effect between the Temperature Sensitive Polymer and the reactive cured component. After curing, cooling down the gel below the gelation temperature, results in liquefying the gel, thus it can easily be removed by rinsing with water. The reactive component is at least one of an acrylic component, a molecule having one or more vinyl ether substituent, or a water-soluble and/or reducible, that can be dissolved in the aqueous medium when formulated, and after curing it is capable of swelling upon exposure to water or to an alkaline or acidic water solution.

In one embodiment, the curable reactive component is a (meth)acrylic component. In another embodiment, the (meth)acrylic component is a (meth)acrylic monomer, a (meth)acrylic oligomer, or a combination thereof. In another embodiment, the (meth)acrylic component is a polyethylene glycol mono or di (meth)acrylated, polyether triacrylate or any combination thereof. In another embodiment, the reactive component is a water miscible component that is, after irradiation or curing, capable of dissolving or swelling upon exposure to water or to an alkaline or acidic water solution. In another embodiment, the water miscible component is an acryloyl morpholine, (meth)acrylated urethane oligomer derivative of polyethylene glycol, a partially (meth)acrylated polyol oligomer, an (meth)acrylated oligomer having hydrophillic substituents or any combination thereof. In another embodiment, the hydrophilic substituents are acidic substituents, amino substituents, hydroxy substituents or any combination thereof. In another embodiment, the (meth) acrylic component is beta-carboxyethyl acrylate. In one embodiment, the reactive component is a molecule having one or more vinyl ether substituents. In another embodiment, the vinyl ether substituent is hydroxy-butyl vinyl ether.

The acrylic component is an acrylic monomer or acrylic oligomer, and may be any one of the examples defined hereinabove. Examples of acrylic components for use in the formulation used with embodiments of the present invention are polyethylene glycol monoacrylate, marked by Laporte under the trade name Bisomer PEA-6, and polyethylene glycol diacrylate, marked by Sartomer under the trade names: SR-610 and SR 344, Etoxylated TMPTA: SR 415, Polyether triacrylate: CN-435, and the like.

The reactive component of the formulation can also be a water miscible component that, after curing, is capable of swelling or even dissociating upon exposure to water or to an alkaline or acidic water solution. Examples of water miscible components used with embodiments of the present invention are: Acryloyl morpholine marked by UCB under the trade name of ACMO, an acrylated urethane oligomer derivative of polyethylene glycol-polyethylene glycol urethane diacrylate, a partially acrylated polyol oligomer, an acrylated oligomer having hydrophilic substituent, or any combination thereof.

The hydrophilic substituent are acidic substituent, amino substituent, hydroxy substituent, or any combination thereof. An example of an acrylated oligomer with hydrophilic substituent is beta-carboxyethyl acrylate, which contains cidic substituents. The reactive component can also be a molecule having one or more vinyl ether substituent, which may be any of the compounds as defined hereinabove. An example of vinyl ether for the support and/or building composition material is hydroxy-butyl vinyl ether, marked by BASF under the trade name of HBVE.

In one embodiment, the photo-initiator is a free radical photo-initiator, a cationic photo-initiator, or any combination thereof.

In one embodiment, the free radical photo-initiators are benzophenones, acylphosphine oxide, alpha-amino ketone or any combination thereof.

In one embodiment, the photo-initiator further comprises a co-initiator component. In another embodiment, the co-initiator component is triethanol amine.

The free radical photo-initiator can be any compound that produces a free radical on exposure to radiation such as ultraviolet or visible radiation and thereby initiates a polymerization reaction. Examples of some suitable photo-initiators include benzophenones (aromatic ketones) such as benzophenone, methyl benzophenone, Michlers ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's) benzoins and benzoin alkyl ethers such as benzoin, benzoin methyl ether and benzoin isopropyl ether and the like. Examples of photo-initiators are alpha-amino ketone, marked by Ciba Specialties Chemicals Inc. (Ciba) under the trade name of Irgacure 907, and bisacylphosphine oxide (BAPO's), marked by Ciba under the trade name of I-819.

The free-radical photo-initiator can be used alone or in combination with a co-initiator. Co-initiators are used with initiators that need a second molecule to produce a radical that is active in the UV-system.

In one embodiment, the cationic photo-initiator is selected from the group comprising: aryldiazonium salts, diaryliodonium salts, triarylsulphonium salts, triarylselenonium salts and triarylsolfonium hexafluoroantimonate salts, or any combination thereof.

Suitable cationic photo-initiator used with embodiments of the present invention include compounds which form aprotic acids or bronsted acids upon exposure to ultraviolet and/or visible light sufficient to initiate polymerization. The photo-initiator used may be a single compound, a mixture of two or more active compounds, or a combination of two or more different compounds, i.e. Co-initiators. Examples of suitable cationic photo-initiators are aryldiazonium salts, diaryliodonium salts, triarylsulphonium salts, triarylselenonium salts and the like. In one embodiment, the cationic photo-initiator is a mixture of triarylsolfonium hexafluoroantimonate salts marketed by Union Carbide as UVI-6974.

Other components of the composition are inhibitors (thermal stabilizers). In one embodiment, the stabilizer is 4-methoxy phenol. Inhibitors are employed in the formulations to permit the use of the formulation at room temperature and elevated temperatures, without causing thermal polymerization.

Examples of characteristic components of the polymeric compositions are provided in Table 1 herein below. Examples of possible formulations of the support and/or building compositions are provided in Table 2 herein below.

TABLE 2

Examples of Possible Formulations of the Support and/or Building Compositions

| Example | A | B | C | D | E | F | G | H | I | J | K | L | M | N |
|---|---|---|---|---|---|---|---|---|---|---|---|---|---|---|
| 1 | X | | | | X | | | | | | | | X | |
| 2 | | X | | | X | | | | | | | | X | |
| 3 | | | X | | X | | | | | | X | | X | X |
| 4 | | | | X | X | X | | | | | | | X | |
| 5 | X | | | | X | | X | | | | X | | X | X |
| 6 | | X | | | X | | X | | | | X | | X | X |
| 7 | | | | X | X | | | X | | | X | | X | X |
| 8 | X | | | | X | | | X | | | X | | X | X |
| 9 | | X | | | X | | | X | | | X | | X | X |
| 10 | X | | | | X | | | | X | | X | | X | X |
| 11 | | X | | | X | | | | X | | X | | X | X |
| 12 | | | X | | X | | | | | X | X | X | X | X |
| 13 | X | | | | X | | | X | | | X | X | X | X |

TABLE 1

Examples of Characteristic Components of the Support and/or Building Compositions

| # | Trade Name | Chemical Type | Function | Supplier |
|---|---|---|---|---|
| A | Pluronic: F-127, F-108, F-98, F-88, F-68, F-87, F-77, P-105, P-85, P-75, P-65, P-104, P-94, P-84, L-64, L-63, L-121, L-122. | PEO-PPO-PEO block copolymer | Temperature sensitive polymer | BASF |
| B | Poly[Pluronic-X]$_m$ Chain extension products of Pluronic with X-chain extender. | Polyurethanes, Polycarconates, polyesters | Temperature sensitive polymer | Home made |
| C | NIPAAM | N-Isopropyl Acryl Amide | Temperature sensitive polymer | Aldrich |
| D | EHEC | Ethyl Hydroxy ethyl cellullose | Temperature sensitive polymer | Akzo Nobel |
| E | Water | Water | Aqueous media | |
| F | SDS | Sodium dodecyl sulphonate | Surface active agent | Aldrich |
| G | Bisomer PEA-6 | Polyethylene Glycol monoacrylate | Photo-curable reactive monomer Water soluble | Laport |
| H | SR-344 | Polyethylene Glycol (400) di-acrylate | Photo-curable reactive monomer Water soluble | Sartomer |
| I | ACMO | Acryloyl morpholine | Photo-curable reactive monomer Water soluble | UCB |
| J | HBVE | Hydroxy Butyl Vinyl Ether | Vinyl ether monomer | BASF |
| K | Irgacure-2959 | Alpha-Hydroxy ketone For waterborn formulations | Free radical photo-initiator. Type I | CIBA |
| L | Triethanol Amine | Ternary Amine | Free radical Coinitiator for type II photoinitiator | J. T. Baker |
| M | Byk 345 | Silicon Surface Additive | Surface agent | Byk Chemie |
| N | MEHQ | 4-Methoxy phenol | Inhibitor (thermal stabilizers) | Sigma |

In one embodiment, the formulation of the support and/or building composition is presented in entry No. 2.

In one embodiment, the formulation of the support and/or building composition is presented in entry No. 1.

In one embodiment, the formulation of the support and/or building composition is presented in entry No. 6.

In one embodiment, the formulation of the support and/or building composition is presented in entry No. 5.

Model Composition

In one embodiment the model composition is used for the building a three-dimensional object.

The model composition is formulated to give, after curing, a solid material with mechanical properties that permit the building and handling of three-dimensional models. The model composition used with an embodiment of the present invention comprises:

at least one reactive component;
at least one photo-initiator;
at least one surface-active agent; and
at least one stabilizer.

In one embodiment, the reactive component is an acrylic component, a molecule having one or more epoxy substituents, a molecule having one or more vinyl ether substituents, vinylpyrolidone, vinylcaprolactam, or any combination thereof. The acrylic component is an acrylic monomer, an acrylic oligomer, an acrylic crosslinker, or any combination thereof.

An acrylic monomer is a monofunctional acrylated molecule which can be, for example, esters of acrylic acid and methacrylic acid. An example of an acrylic monomer used with an embodiment of the present invention is phenoxyethyl acrylate, marketed by Sartomer under the trade name SR-339. Another example of an acrylic monomer is marketed by Sartomer under trade name SR-9003.

An acrylic oligomer is a polyfunctional acrylated molecule which can be for example polyesters of acrylic acid and methacrylic acid and a polyhydric alcohol, such as polyacrylates and polymethacrylates of trimethylolpropane, pentaerythritol, ethylene glycol, propylene glycol and the like. Examples of acrylic oligomers are the classes of urethane acrylates and urethane methacrylates. Urethaneacrylates are manufactured from aliphatic or cycloaliphatic diisocyanates or polyisocyanates and hydroxyl-containing acrylic acid esters. An example is a urethane-acrylate oligomer marketed by Cognis under the trade name Photomer-6010.

An acrylic crosslinker is a molecule which provides enhanced crosslinking. Examples of such resins are 1,4-butanediol diacrylate, 1,4-butanediol dimethacrylate, 1,6-hexamethylene glycol diacrylate, neopentyl glycol dimethacrylate, trimethylol propane trimethacrylate, pentaerythritol triacrylate, penta-erythritol trimethacrylate triethylene glycol triacrylate, triethylene glycol trimethacrylate, and the like. An example of an acrylic crosslinker used with one embodiment of the is trimethylol propane triacrylate, marketed by Sartomer under the trade name SR-351. Another example of a crosslinker is UVM-45, marketed by CRODA.

The reactive component in the model composition can also be a molecule having one or more vinyl ether substituents. Conventional vinyl ether monomers and oligomers which have at least vinyl ether group are suitable. Examples of vinyl ethers are ethyl vinyl ether, propyl vinyl ether, isobutyl vinyl ether, cyclohexyl vinyl ether, 2-ethylhexyl vinyl ether, butyl vinyl ether, ethyleneglocol monovinyl ether, diethyleneglycol divinyl ether, butane diol divinyl ether, hexane diol divinyl ether, cyclohexane dimethanol monovinyl ether and the like. In one embodiment, the vinyl ether is 1,4 cyclohexane dimethanol divinyl ether, marketed by ISP under the trade name CHVE.

The reactive component in the model composition can also be a molecule having one or more epoxy substituents. In one embodiment, the conventional epoxy monomers and oligomers have at least one oxirane moiety. Suitable epoxy containing molecules are displayed in Table 3 below:

TABLE 3

Examples of Epoxy-Containing Reactive Component

| Trade Name | Type of Material | Supplier |
| --- | --- | --- |
| ERL-4299 or UVR-6128 | Bis-(3,4 cyclohexylmethyl) adipate | Union Carbide |
| UVR-6105 and UVR-6110 | 3,4-epoxy cyclohexylmethyl-3,4- epoxycyclohexyl carboxylate | Union Carbide |
| D.E.R 732 | Aliphatic epoxy, Polyglycol diglycidyl ether | Dow chemicals |
| Vinylcyclohexene Monoxide | 1,2 epoxy-4-vinylcyclohexane | Union Carbide |
| D.E.N. 431 | Epoxy novolac resin | Dow corning |
| UVR-6216 | 1,2-epoxy hexadecane | Union Carbide |
| UVI-6100 | Cycloaliphatic epoxide diluent | Union Carbide |
| Vikoflex 7170 | Fullyl epoxidized soy bean oil | Elf Atochem, INC. |
| ERL-4221D | 3,4-epoxy cyclohexylmethyl 3,4-epoxy cyclohexane carboxylate | Union Carbide |

The reactive component of the model composition can comprise any combination of an acrylic component as defined hereinabove, a molecule having one or more epoxy substituents as defined hereinabove, a molecule having one or more vinyl ether substituents as defined hereinabove, vinylcaprolactam and vinylpyrolidone.

In one embodiment the reactive component of the model composition comprises an acrylic monomer, an acrylic oligomer, an acrylic crosslinker and vinylcaprolactam. In another embodiment, the reactive component comprises an acrylic component as defined hereinabove and a molecule having one or more epoxy substituents as defined hereinabove. In another embodiment, the reactive component of the model composition comprises an acrylic component as defined hereinabove and a molecule having one or more vinyl ether substituents as defined hereinabove. In another embodiment, the reactive component in the model composition comprises a molecule having one or more vinyl ether substituents as defined hereinabove, and a molecule having one or more epoxy substituents as defined hereinabove.

The photo-initiator of the model composition and of the support and/or building composition may be the same or different, and is a free radical photo-initiator, a cationic photo-initiator, or any combination thereof.

The free radical photo-initiator can be any compound that produces a free radical on exposure to radiation such as ultraviolet or visible radiation and thereby initiates a polymerization reaction. Examples of some suitable photo-initiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photo-initiators are alpha-amino ketone, marketed by Ciba Specialties Chemicals Inc. (Ciba) under the trade name Irgacure 907, and bisacylphosphine oxide (BAPO's), marketed by Ciba under the trade name I-819.

The free-radical photo-initiator can be used alone or in combination with a co-initiator. Co-initiators are used with initiators that need a second molecule to produce a radical that is active in the UV-systems. Benzophenone is an example of a photoinitiator that requires a second molecule, such as an amine, to produce a reactive radical. After absorbing radiation, benzophenone reacts with a ternary amine by hydrogen abstraction, to generate an alpha-amino radical which initiates polymerization of acrylates. An example of a class of co-initiators are alkanolamines such as triethylamine, methyldiethanolamine and triethanolamine.

Suitable cationic photo-initiators used with embodiments of the present invention include compounds, which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Examples of suitable cationic photo-initiators are aryldiazonium salts, diaryliodonium salts, triarylsulphonium salts, triarylselenonium salts and the like. In one embodiment, the cationic photo-initiator for the present invention is a mixture of triarylsolfonium hexafluoroantimonate salts marketed by Union Carbide as UVI-6974.

Other components of the model composition and the support and/or building composition used with embodiments of the present invention are surface-active agents and inhibitors (thermal stabilizers). A surface-active agent is used to reduce the surface tension of the formulation to the value required for jetting, which is typically around 30 dyne/cm. In one embodiment of the present invention, a surface-active agent is silicone surface additive, marketed by Byk Chemie under the trade name Byk 307. Inhibitors are employed in the formulations of the model composition and the support and/or building composition to permit the use of the formulation at high temperature, preferably around 85 C, without causing thermal polymerization.

In one embodiment of the present invention, the model composition further comprises at least one pigment and at least one dispersant. The pigment is a white pigment, an organic pigment, an inorganic pigment, a metal pigment or a combination thereof. In another embodiment of the present invention, a white pigment is organic treated titanium dioxide, marketed by Kemira Pigments under the trade name UV TITAN M160 VEG. An example of an organic pigment used with embodiment of the present invention is an organic pigment marketed by Elementis Specialities under the trade name Tint Aid PC 9703. Examples of dispersants used with embodiments of the present invention are dispersants comprising a copolymer with acidic groups marketed by Byk Chemie under the trade name Disperbyk 110, and a dispersant comprising a high molecular weight block copolymer with pigment affinic groups, marketed by Byk Chemie under the trade name Disperbyk 163.

Furthermore, in one embodiment of the present invention, combinations of white pigments and dyes are used to prepare colored resins. In such combinations, the white pigment has a double task: 1) to impart opacity; and 2) to shield the dye from UV radiation, to prevent bleaching of the resin. Thus, in accordance with one embodiment of the present invention, the model composition further comprises a dye. The dye is chosen so as not to interfere with the curing efficiency of the formulation of the model composition. The dye may be any of a broad class of solvent soluble dyes. Some examples are azo dyes, which are yellow, orange, brown and red; anthraquinone and triarylmethane dyes which are green and blue; and azine dye which is black. In one embodiment of the present invention, the dye is Solvent Red 127, marketed by Spectra Colors Corp. under the trade name Spectrasol RED BLG.

The relative proportions of the different components of the model composition can vary. In one embodiment, the model composition comprises the following components: 50% acrylic oligomer(s), 30% acrylic monomer(s), 15% acrylic crosslinker, 2% photoinitiator, surface active agent, pigments, dispersants; and stabilizers.

Examples of formulations of the model composition are provided hereinbelow in Tables 4-6, to which reference is now made. Tables 4 and 5 illustrate examples of possible formulations of the model composition. Table 6 illustrates examples of colored formulations, which comprise pigments, dispersants and dyes, as defined hereinabove. To any of the examples in Tables 4 and 5 may be added the combination of the colorants of Table 6.

TABLE 4

Examples of Characteristic Formulation Components of Model Composition

| # | Trade Name | Chemical Type | Function in the formulation | Supplier |
|---|---|---|---|---|
| A | Photomer-6010 | Urethane Acrylate Oligomer | Oligomer | Cognis |
| B | SR-339 | Phenoxy ethyl Acrylate | monomer | Sartomer |
| C | SR-351 | Trimethylol propane triacrylate | Cross-linker | Sartomer |
| D | Irgacure 907 | alpha-Amino Ketone | Free radical photo-initiator | Ciba Specialties Chemical Inc. |
| E | BP | Benzophenone | Free radical photo-initiator | Satomer |
| F | Triethanol Amine | 1. Ternary Amine | Free radical Coinitiator | Sigma |
| G | Byk 307 | Silicone Surface Additive | Surface agent | Byk Chemie |
| H | MEHQ | 4-Methoxy phenol | Inhibitor | Sigma |
| I | Cyracure UVR-6110 | 3,4 Epoxycyclohexylmethyl-3,4-epoxycyclohexylcarboxylate | Epoxy oligomer | Union Carbide |
| J | UVI-6974 | Mixed Triarylsulfonium Hexafluoroantimonate Salts | Cationic photo-initiator | Union Carbide |

TABLE 4-continued

Examples of Characteristic Formulation Components of Model Composition

| # | Trade Name | Chemical Type | Function in the formulation | Supplier |
|---|---|---|---|---|
| K | CHVE | 1,4-cyclohexane dimethanol divinyl ether | Vinyl Ether Monomer | ISP |
| L | UV TITAN M160 VEG | Organic Treated Titanium Dioxide | White pigment | KEMIRA PIGMENTS |
| M | Disperbyk 110 | Copolimer with acidic groups | Pigment Dispersant | Byk Chemie |
| N | Spectrasol RED BLG | Solvent Red 127 | Dye | Spectra Colors Corp. |
| O | Tint Aid PC 9703 | Organic pigment | Organic pigment | Elementis Specialties |
| P | Disperbyk 163 | High molecular weight block copolymer with pigment affinic groups | Pigment Dispersant | Byk Chemie |
| Q | V-Cap | Vinylcaprolactam | Monomer | ISP |
| R | V-Pyrol | Vinylpyrolidone | Monomer | ISP |

TABLE 5

Examples of Possible Formulation Compositions of Model Composition

| Example | A | B | C | D | E | F | G | H | I | J | K | Q | R |
|---|---|---|---|---|---|---|---|---|---|---|---|---|---|
| 1 | X | X | X | X | | | | X | X | | | | |
| 2 | X | X | | X | | | | X | X | | | | |
| 3 | X | | X | X | | | | X | X | | | | |
| 4 | | X | X | X | | | | X | X | | | | |
| 5 | X | X | X | | X | X | X | X | | | | | |
| 6 | X | X | | | X | X | X | X | | | | | |
| 7 | X | | X | | X | X | X | X | | | | | |
| 8 | | X | X | | X | X | X | X | | | | | |
| 9 | X | | X | X | | | X | X | | | X | | |
| 10 | X | | X | | X | X | X | X | | | X | | |
| 11 | | | | | | | X | X | X | X | X | | |
| 12 | | X | X | X | | | X | X | X | X | | | |
| 13 | X | X | X | X | X | X | X | X | X | X | | | |
| 14 | X | X | X | X | | | X | X | | | | X | |
| 15 | X | X | X | X | | | X | X | | | | | X |

TABLE 6

Examples of Colored Formulations of Model Composition

| Example | L | M | N | O | P |
|---|---|---|---|---|---|
| 16 | X | X | | | |
| 17 | X | X | X | | |
| 18 | X | X | | X | X |
| 19 | | | | X | X |
| 20 | | | X | X | X |

In one embodiment, the formulation of the model composition is presented in entry No. 14 of Table No. 5. According to this embodiment, the model composition comprises an acrylic oligomer, which can be any acrylic oligomer as defined hereinabove, and which is according to one embodiment a urethane acrylate oligomer;

an acrylic monomer, which can be any acrylic monomer as defined hereinabove, and which is according to one embodiment a phenoxy ethyl acrylate;

an acrylic crosslinker, which can be any acrylic crosslinker as defined hereinabove, and which is according to one embodiment a trimethylol propane triacrylate;

a radical photo-initiator, which can be any radical photo-initiator as defined hereinabove, and which is according to one embodiment an alpha-amino ketone;

a surface agent, which is according to one embodiment a silicon surface additive;

an inhibitor, which is according to one embodiment a 4-methoxyphenol; and vinylcaprolactam.

Reference is made to FIG. 1: a typical RTG graph of viscosity—temperature relation is shown. At a specific temperature $T=T_{min}$ the specific composition has its minimal viscosity $\eta_{min}$. Raising the temperature induces an increase in viscosity until at $T=T_{gel}$ the composition is transformed into gel, i.e. an abrupt change in the mechanical properties of the composition occurs. Further raising the temperature to $T=T_2$ increases the viscosity of the gel until the required viscosity for the supporting and/or building composition is attained. Moreover, the gelation process is reversible, i.e. lowering the temperature of the gel below $T=T_{gel}$, for example $T=T_1$, causes the gel to liquefy to its starting liquid phase.

Furthermore, the polymeric composition has a first low viscosity, $\eta_1$, at a first temperature, $T_1$ that is lower than $T_{gel}$. $\eta_1$ is compatible with ink-jet printer at $T_1$. After dispensed, the composition temperature is raised to a temperature above $T_{gel}$ whereas the material becomes a stiff gel. At its gel position the material has favorable characteristics as a support and/or building material. The gel layers have the appropriate toughness and dimensional stability. Furthermore, after the construction process is completed the gel can easily be washed away by lowering the temperature below $T_{gel}$ whereas the gel liquefy and rinsing with water. The composition is totally water-soluble even at its gel position. In addition, the composition has no toxic effect on environment and can be disposed without causing any ecological harmful effects.

Embodiments of the present invention relate to using the phenomenon of Reverse Thermal Gelation (RTG) and the materials exhibiting these characteristics as support materials (SM) in the RP, RT or RM processes. Several basic compositions exhibiting the RTG phenomenon are disclosed; others may be used with embodiments of the present invention.

"Reverse Thermal Gelation" (RTG) is the phenomena whereby a material or a solution of a material spontaneously increases in viscosity, and in many instances transforms into a semisolid gel, as the temperature of the solution is increased above the gelation temperature of the copolymer. When cooled below the gelation temperature, the gel spontaneously reverses to reform the lower viscosity solution. This cycling between the solution and the gel may be repeated because the sol/gel transition does not involve any change in the chemical composition of the polymer system. All interactions to create the gel are physical in nature and do not involve the formation or breaking of covalent bonds. "Gelation temperature" means the temperature at which a solution transitions to become a gel. "Aqueous solution" means a water based solution having a gel forming block copolymer dissolved therein at a functional concentration, and maintained at a temperature above or below the gelation temperature such that gel formation does not occur.

In the above description, various aspects of the present invention have been described. For purposes of explanation, specific configurations and details were set forth in order to provide a thorough understanding of the embodiments of the present invention. However, it will also be apparent to one skilled in the art that the embodiments of the present invention may be practiced without the specific details presented herein. Furthermore, well-known features may be omitted or simplified in order not to obscure the embodiments of the present invention.

It will be appreciated by persons skilled in the art that the embodiments of the present invention is not limited by what has been particularly shown and described hereinabove, and that numerous modifications, all of which fall within the scope of the embodiments of the present invention, exist. Rather the scope of the invention is defined by the claim that follows:

What is claimed is:

1. A composition comprising:
   at least one temperature sensitive compound;
   at least one surface tension-reducing additive;
   at least one photo curable component;
   at least one photo-initiator; and
   at least one thermal stabilizer,
wherein said composition exhibits reverse thermal gelation (RTG) properties and is suitable for supporting and/or building a three-dimensional object by rapid prototyping.

2. The composition according to claim 1, wherein said temperature sensitive compound is water-soluble.

3. The composition according to claim 2, wherein said temperature sensitive compound is an ABA tri-block structure.

4. The composition according to claim 3, wherein A is a hydrophilic oligomer and B is a hydrophobic oligomer.

5. The composition according to claim 3, wherein A is a hydrophobic oligomer and B is a hydrophilic oligomer.

6. The composition according to claim 3, wherein A and B comprise aliphatic polyether and/or polyester units.

7. The composition according to claim 3, wherein A is poly(ethylene oxide) and B is poly(propylene oxide).

8. The composition according to claim 2, wherein said temperature sensitive compound is a multi-block $(ABA-X)_m$ structure, organized at random or repetitive configuration, where m is an integer of 1-30, and X is a chain extender.

9. The composition according to claim 8, wherein X is selected from a group consisting of di, tri and poly isocyanates, di, tri and poly carboxylic acids, diacyl halides, triphosgene or any combination thereof.

10. The composition according to claim 8, wherein A is a hydrophilic oligomer and B is a hydrophobic oligomer.

11. The composition according to claim 8, wherein A is a hydrophobic oligomer and B is a hydrophilic oligomer.

12. The composition according to claim 8, wherein said multi-block structure is a polyurethane, a polycarbonate, a polyester or any combination thereof.

13. The composition according to claim 2, wherein said temperature sensitive compound is a poly (N-substituted (meth)acrylamide).

14. The composition according to claim 13, wherein said poly (N-substituted (meth)acrylamide) is a poly (N-isopropyl (meth)acrylamide).

15. The composition according to claim 2, wherein said temperature sensitive compound is hydroxypropyl methylcellulose, ethyl hydroxyethyl cellulose (EHEC) or any combination thereof.

16. The composition according to claim 1, wherein said surface tension-reducing additive is capable of reducing the surface tension of said composition to about 30 dyne/cm.

17. The composition according to claim 1, wherein said surface tension-reducing additive is a silicon surface-active agent additive, a fluoro-based surface-active agent or a combination thereof.

18. The composition according to claim 1, wherein said photo curable component is a (meth)acrylic component attached to the temperature sensitive compound.

19. The composition according to claim 18, wherein said (meth)acrylic component is a (meth)acrylic monomer, a (meth)acrylic oligomer, or a combination thereof.

20. The composition according to claim 18, wherein said (meth)acrylic component is a polyethylene glycol mono or di (meth)acrylated, polyether triacrylate or any combination thereof.

21. The composition according to claim 1, wherein said photo curable component is a water miscible component that, after irradiation or curing, is capable of dissolving or swelling upon exposure to water or to an alkaline or acidic water solution.

22. The composition according to claim 21, wherein said water miscible component is an acryloyl morpholine, a (meth)acrylated urethane oligomer derivative of polyethylene glycol, a partially (meth)acrylated polyol oligomer, an (meth)acrylated oligomer having one or more hydrophilic substituents or any combination thereof.

23. The composition according to claim 22, wherein at least one of said hydrophilic substituents is an acidic substituent, an amino substituent, a hydroxy substituent, or any combination thereof.

24. The composition according to claim 18, wherein said (meth)acrylic component is beta-carboxyethyl acrylate.

25. The composition according to claim 1, wherein said photo curable component is a molecule having one or more vinyl ether substituents.

26. The composition according to claim 25, wherein at least one of said vinyl ether substituents is hydroxy-butyl vinyl ether.

27. The composition according to claim 1, wherein said photo-initiator is a free radical photo-initiator, a cationic photo-initiator, or any combination thereof.

28. The composition according to claim 27, wherein said free radical photo-initiator is benzophenone, an acylphosphine oxide, an alpha-amino ketone or any combination thereof.

29. The composition according to claim 27, wherein said cationic photo-initiator is selected from the group consisting of aryldiazonium salts, diaryliodonium salts, triarylsulphonium salts, triarylselenonium salts and triarylsolfonium hexafluoroantimonate salts.

30. The composition according to claim 27, wherein said photo-initiator further comprises a co-initiator component.

31. The composition according to claim 30, wherein said co-initiator component is triethanol amine.

32. The composition according to claim 1, wherein said stabilizer is 4-methoxy phenol.

* * * * *